United States Patent [19]

Pelas

[11] Patent Number: 5,086,998
[45] Date of Patent: Feb. 11, 1992

[54] AIR/SEA RESCUE DEVICE

[76] Inventor: Larry Pelas, P.O. Box 802, Venice, La. 70091

[21] Appl. No.: 484,420

[22] Filed: Feb. 26, 1990

[51] Int. Cl.⁵ .............................................. B64C 1/08
[52] U.S. Cl. .............................. 244/137.2; 244/118.1; 244/17.17; 441/83
[58] Field of Search ................. 441/80, 83; 244/17.17, 244/118.1, 137.2

[56] References Cited

U.S. PATENT DOCUMENTS

| | | | |
|---|---|---|---|
| 3,904,155 | 9/1975 | Chavis | 244/137.2 |
| 4,188,000 | 2/1980 | Dalziel | 244/137.2 |
| 4,553,719 | 11/1985 | Ott | 244/118.1 |
| 4,588,148 | 5/1986 | Krauchick | 244/137.2 |
| 4,610,635 | 9/1986 | Austevoll | 441/80 |
| 4,637,575 | 1/1987 | Yenzer | 244/118.1 |
| 4,678,446 | 7/1987 | Dahan | 441/80 |
| 4,861,299 | 8/1989 | Ueberschaer | 441/80 |
| 4,993,665 | 2/1991 | Sparling | 244/118.1 |

FOREIGN PATENT DOCUMENTS 1535289  6/1968  France ........................... 244/137.2

Primary Examiner—Sherman Basinger
Assistant Examiner—Thomas J. Brahan
Attorney, Agent, or Firm—Thomas S. Keaty

[57] ABSTRACT

The invention relatres to an Air/Sea Rescue Device to allow retrieval of persons or objects floating near the surface of water for use with a rescue helicopter. The device provides for the use of an upper frame which is attached to the skids of the helicopter and a lower net frame which is spaced from the upper frame by a plurality of support bars extending between the upper frame and the lower net frame. A scoop-like net is carried by the lower net frame, the net having an open front end and an open top to facilitate positioning of the retrieved persons or objects within the frame even without any cooperation from the persons or objects to be rescued, and the objects are in full view of pilot at all times.

14 Claims, 2 Drawing Sheets

AIR/SEA RESCUE DEVICE

BACKGROUND OF THE INVENTION

The present invention relates to air/sea rescue devices and more specifically to a net and support structure secured to the underside of a helicopter for scooping, at least partially, floating items out of the open water.

There are a variety of different air/sea rescue devices used in today's industry, these include air rescue nets which are mounted on extended pivoting arms, air rescue nets which are dragged in the open water, sea rescue ramps, cargo pick-up nets with hooks to secure onto helicopters, and rescue capsule for use with helicopters.

There are a number of air/sea rescue devices which are constructed to combine the principles of the helicopter and net for air/sea rescue. See, e.g., U.S. Pat. Nos. 4,188,000; 4,113,207; 3,228,044; 3,036,315; 3,232,565; 3,158,357; and 3,934,847.

There are many drawbacks to these prior designs for air/sea rescue devices. For example, in the construction which requires the extending pivotal arms, the structure is not inherently stable. This construction requires that a movable weight is needed to balance the helicopter when the pivot arms are extended in front of the helicopter. This balancing trick is much too cumbersome and dangerous when timing is critical, as in instances of an emergency air/sea rescue. Should the weights not be properly placed, when an object is placed in the netting, it may cause a dangerous imbalance of the helicopter, placing the object in danger of being struck by the rotating blades, or even placing the helicopter itself in danger of crashing.

In the construction wherein the net is dragged in open water to catch the floating object, the danger exists that the object will be struck by the frame of the netting, since the netting is being dragged by a cable or line of some nature. In considering wave action and current, the netting is fighting the nature's elements to stay on target to scoop the floating object and the chance of some mishap as described before is increased. In these instances, the pilot looses sight of the object to be retrieved, as the helicopter moves past it, since the net is normally dragged a distant behind the helicopter.

The prior constructions have much too many working parts that may fail at some instance. Each device requires that precise timing and coordination of the rescue device and helicopter be performed. Otherwise the helicopter and deice to be rescued are endangered. It would be wise and prudent to remove as many of these possible variables to lower the chances for error and accidents.

There also exists the possibility that the floating object is inanimate and unable to help in the rescue, therefore the air/sea rescue devices which require action or assistance by the object are impractical and unreliable. It is necessary to provide a device that can retrieve an object from open water without assistance from that object.

It is toward the solution of these inherent problems and dangers that the present invention is directed.

SUMMARY OF THE INVENTION

The present invention achieves its objects and overcomes deficiencies of the prior art by providing an air/sea rescue device adapted for attachment to skids of a rescue helicopter. The rescue device is provided with an upper attachment frame which directly attaches to skids of the helicopter a lower net frame which is spaced from the upper attachment frame by a plurality of support bars extending from the upper frame means angularly at a distance downwardly and carrying the net frame by their lower ends. The upper attachment frame is comprised of four (4) bars connected to each other at right angles to form a rectangular frame, with a pair of parallel elongated bars attachable to the helicopter skids. The support bars extend from the corners connecting the bars of the upper attachment frame downwardly and outwardly from an imaginary vertical plane passing through the bars of the upper attachment frame. The lower net frame is comprised of four (4) elongated bars, the longitudinal dimensions of which are substantially greater, especially in the forward direction then the dimensions of the upper frame bars.

A deformable net is secured, such as by tying, to the lower frame and extends downwardly therefrom. The net is "scoop"-shaped, so that it provides an open, slightly turned upwardly forward and an open top. The net is formed by a rectangular bottom panel, a rectangular back panel and two generally triangularly shaped side panels having a right triangular shape. The side of the side panels which forms hypotenuse of the triangle is secured to the longest parallel bars of the net frame. The upper end of the back panel is secured to the cross bar of the net frame, while the lower side of the back panel is secured to the rearmost side of the bottom panel. The sides of the back panel are connected to the shortest sides of the triangular side panels. The forward end of the bottom panel is secured to the front cross bar of the net frame. Optionally, the front cross bar of the net frame can be slightly bent to better accommodate wave motions affecting the bar when it is lowered into water. An arched reinforcement bar extends between the elongated bars of the net frame upwardly and is secured to the net frame adjacent the point of attachment of the support bars to the net frame.

It is, therefore an object of the present invention to provide an air/sea rescue device which allows the retrieval of objects floating near the surface of open water without the necessity of a crewman exiting the air craft of assist in the retrieval.

Another object of the present invention is to provide and air/sea rescue device which is generally ready for use with little to no preparation to engage the device.

Still another object of the present invention is to provide an air/sea rescue device which is non-mechanized and is structurally sound and sturdy.

A further object of the present invention is to provide an air/sea rescue device which is not adversely affected by wave or current conditions, and which can provide near instantaneous retrieval of an object floating near the surface of open water, once sighted.

These and other objects and advantages of the present invention will be more apparent from the following detailed description and considered in view of the accompanying drawings herein.

DETAILED DESCRIPTION OF THE PREFERRED EMBODIMENT

Figure 1:
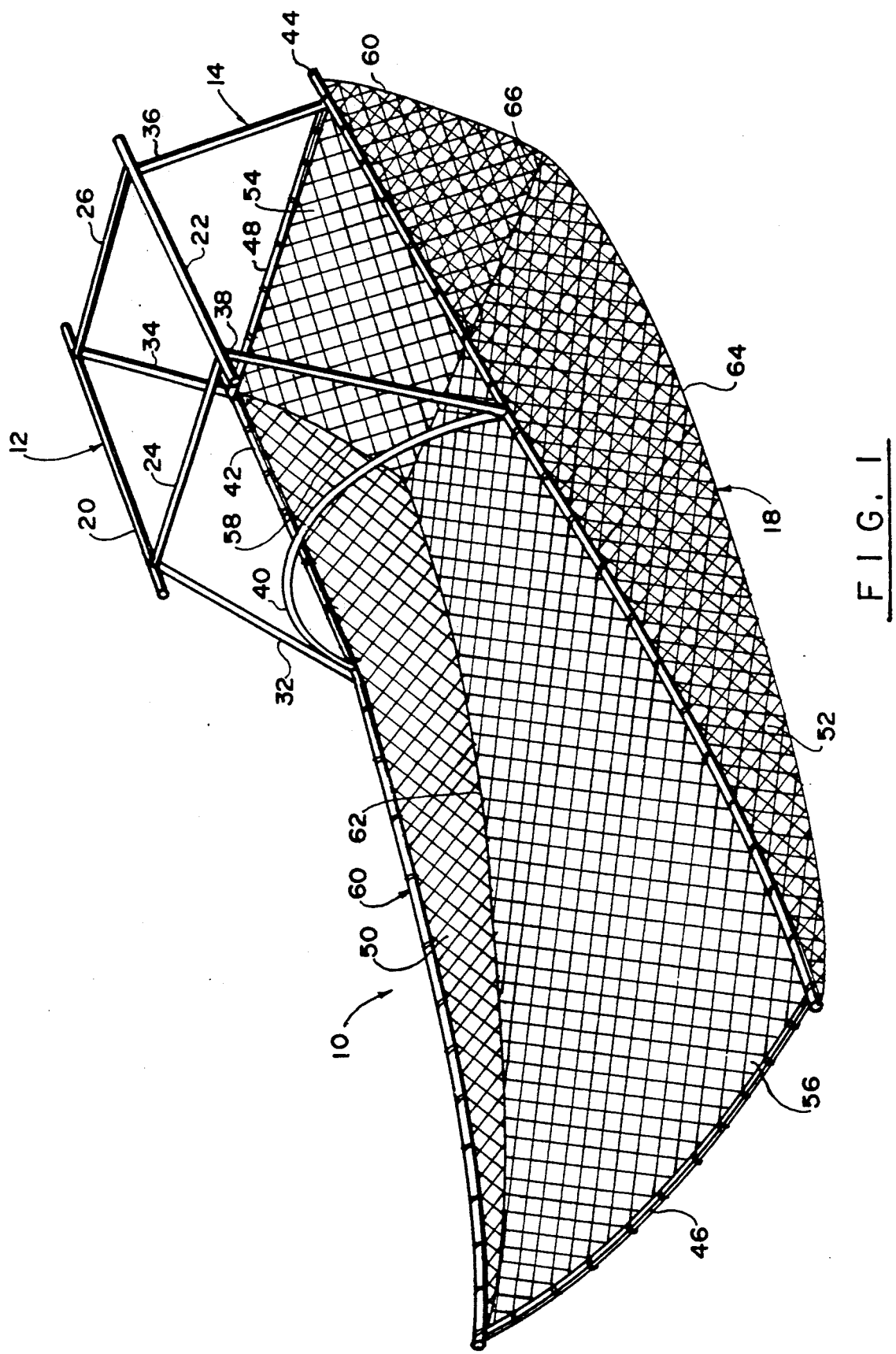
FIG. 1 is a perspective view of the air/sea retrieval device of the present invention.
Figure 2:
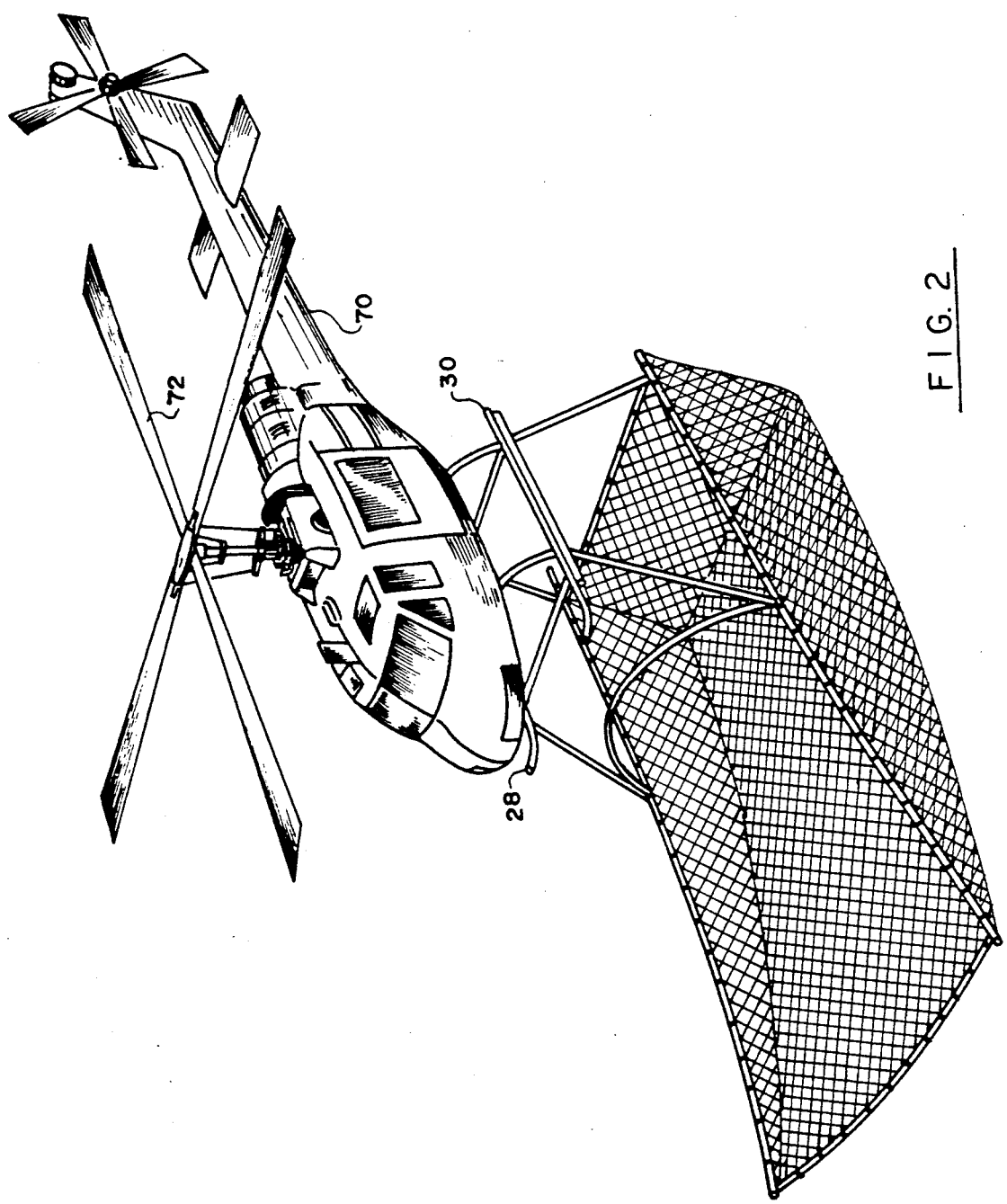
FIG. 2 is a perspective view illustrating the air/sea retrieval device as mounted on a helicopter.

Referring now to the drawings in more detail, the Air/Sea Rescue Device in accordance with the present invention is designated generally by numeral 10.

As can be seen in FIG. 1, the device 10 comprises an upper attachment frame 12, vertically extending spaced support means 14, a lower support frame 16 and a rescue net 18. The upper attachment frame 12 is comprised of a generally rectangularly shaped frame having a peddle longitudinal bars 20 and 22 secured together by a pair of cross bars 24 and 26 the bars 20 and 22 are secured in parallel relationship to each other. Similarly the bars 24 and 26 extend in parallel relationship to each other. The bars 20 and 22 are adapted for fixed attachment to helicopter struts or skids 28 and 30, respectively. As will be appreciated, the length of the transverse bars 24 and 26 equals the space between the skid 28 and 30 of a conventional helicopter. The length of the transverse bars 24 and 26 can be easily amended to adapt to various type and size helicopter.

In order to provide stability to the device 10 for angularly extending brace supports, 34, 36 and 38 extend from the point of connection between the upper frame bars 20, 22, 24 and 26.

To provide further stability to the device 10, and arched support member 40 is rigidly secured to the lower most ends of the support bars 32 and 38.

The lower support frame means 16 is carried and is rigidly attached to the lower most ends of the bars 32, 34, 36 and 38. The bars 34 and 36 are rigidly connected to the rear ends of the elongated bars 44 which form a part of the lower frame 16. The length of the bars 42 and 44 is considerably greater than the length of the parallel upper frame bars 20 and 22, the importance of which will be addressed hereinafter. The frame 16 further comprises a front cross bar 46 which is rigidly attached between forward ends of the bars 42 and 44 and a rear cross bar 48 which, in turn, is rigidly attached between the rear ends of the bars 42 and 44. As can be seen in the drawings, the lower support frame 16 has a generally rectangular shape, with an upper frame 12 supported closer to the rear portion of the frame 16. Carried by the lower support frame 16 is a rescue net 18 which is tied at multiple points to the bars 42, 44, 46 and 48.

The net 18 comprises a pair of side panels 50 and 52, a rear panel 54 and a bottom panel 56. The panels 50 and 52 have a generally triangular configuration and are securely attached to the elongated bars 40 and 42, respectively. The panel 54 has a generally rectangular configuration and is securely tied to the rear cross bar 48, extending downwardly from the bar and being connected to short rear sides of the panels 50 and 52 along seams 58 and 60. The bottom panel 56 has a generally rectangular configuration and is attached along its front end to the front cross bar 46 by securely tieing the net at equidistant type tieing points. The elongated sides of the panel 56 are connected to the bottom sides of the panels 50 and 52 along seam lines 62, and 64. The rear end of the panel 56 is sewn along the seam 66 to the lower side of the panel 54 at the point of its connection to the lower most ends of seams 58 and 60.

As a result a "scoop-like" net 18 is formed by the respective panels 50, 52, 54 and 56. The frame 18, as can be seen has no front wall which might impede retrieval of an object from a water surface or rescue of persons which are unable to assist in the rescue operation and climb over the front wall to get into the rescue net from the water surface. The frame which carries the net is sufficiently sturdy to prevent the net 18 from changing its shape considerably under the influence of wind or water waves. Additionally, the length of the supporting bars 32, 34, 36 and 38 places the rescue net 18 at such a distance from the skids 28 and 30 of the helicopter 70 and, consequently from the blades 72 as not to impede with the rescue operation. The natural center of gravity of the net 18 is shifted towards the center of the net, although the front part extends for a considerable distance forward from the front of the helicopter 70.

The net 18 is made from sufficiently strong cords, so as to with stand adverse environmental conditions and not tear under the influence of waves which will eventually affect during a rescue operation.

The length of the cross bars 46 and 48 is slightly greater than the length of the transverse bars 24 and 26 of the upper support frame 12. The area of the frames 12 and 16 which directly support helicopter 70 has a form of a truncated pyramid, providing stable support for the helicopter during take off and landing.

During a rescue or a retrieval operation, the forward end of the device 10 is brought in close proximity to the person or object to be retrieved from a water surface. By slightly inclining the forward end downwardly and forwardly, the bar 46 is brought into the water to a depth below the plane at which the person or the object could be rescued appears in the water. Further forward movement of the device 10 ensures that the person or the object to be retrieved is well within the area of the bottom panel 56, after which time the helicopter is lifted, lifting the device 10 and the persons or objects which by now have shifted their position towards the center of the device 10 safely from water.

If necessary the rescuers can descend from the helicopter directly into the net 18, since the horizontal limits of the frame 18 are greater than the width of the helicopter 70, so as to attend to the immediate needs of the rescued persons. Once in the air, the rescued people can be safely lifted into the helicopter and delivered to safety.

The bars which form the frames 12, 16 and support bars 14 are sufficiently strong material to withstand not only weight of the helicopter during landing or take off but also to support additional weight of the rescued or retrieved persons or objects.

Many changes and modifications can be made within the design of the present invention without departing from the spirit thereof. I therefor pray that my rights to the present invention be limited only by the scope of the appended claims.

I claim:

1. A rescue device for retrieval of persons or objects from water for use with a helicopter, the device comprising:
    an upper rigid attachment frame means for attaching the device to skids of the helicopter, said upper frame means attachable in substantially co-planar relationship to the helicopter skids;
    a space support means extending downwardly from said upper attachment frame means and fixedly attached to said upper attachment frame means;
    a lower rigid net frame means fixedly attached to a lower portion of said space support means; and
    a deformable net means having an open front end and open top carried along its upper peripheral edge by said lower net frame means in a fixed relationship to said lower net frame means.

2. The device of claim 1, wherein said upper attachment frame means comprises a substantially rectangular frame comprised of two parallel attachment bars adapted for attachment in parallel relationship to the helicopter skids and two transverse bars rigidly attached at right angles adjacent opposite ends of the attachment bars.

3. The device of claim 2, wherein said space support means comprises elongated bars, each extending at an obtuse angle from a corner connecting said parallel and said transverse bars of the upper attachment frame means.

4. A rescue device for retrieval of persons or objects from water for use with a helicopter, the device comprising;
    an upper rigid attachment frame means for attaching the device to skids of the helicopter;
    a space support means extending downwardly from said upper attachment frame means and fixedly attached to said upper attachment frame means;
    a lower rigid net frame means fixedly attached to lower portion of said support means, wherein said lower net frame means comprises a substantially rectangular frame comprised of two parallel elongated bars and two cross bars rigidly attached at right angles adjacent opposite ends of the elongated parallel bars; and
    a deformable net means having an open front end and open top carried along its upper peripheral edge by said lower net frame means in secure relationship to said net frame means.

5. The device of claim 4, wherein said net means comprises a rectangular bottom net panel, a rectangular back net panel and a pair of parallel triangular side panels.

6. The device of claim 5, wherein each of said side panels has two sides connected at approximately a right angle to each other, and a third side opposite a corner formed by said two sides, said third side being secured to one of said elongated bars of the net frame.

7. The device of claim 6, wherein longitudinal dimensions of said net frame bars are greater than longitudinal dimensions of said upper frame bars.

8. The device of claim 4, further comprising an arched reinforcement bar fixedly attached and extending between said elongated bars of said net frame below said upper attachment frame.

9. The device of claim 8, wherein each of said net side panels has a shorter side which is connected to one of the sides of said back net panel.

10. A rescue device for retrieval of persons or objects from water for use with a helicopter, the device comprising:
    an upper rigid attachment frame means for attaching the device to skids of the helicopter, said attachment frame means comprising a substantially rectangular frame comprised of two parallel attachment bars adapted for attachment in parallel relationship to the helicopter skids and two transverse bars rigidly attached at right angles adjacent opposite ends of the attachment bars;
    a space support means extending downwardly from said upper attachment frame means and fixedly attached to said upper attachment frame means, said space support means comprising a plurality of elongated bars, each extending at an obtuse angle from a corner connecting said parallel and said transverse bars of the upper attachment frame;
    a lower rigid net frame means fixedly attached to lower portion of said support means, said net frame means comprising a substantially rectangular frame comprised of two parallel elongated bars and two cross bars rigidly attached at right angles adjacent opposite ends of the elongated parallel bars; and
    a deformable net means having an open front end and an open top carried along its upper peripheral edge by said lower said net frame means in secured relationship to said net frame means, said lower net means comprising a rectangular bottom net panel, a rectangular back net panel and a pair of parallel triangular side panels.

11. The device of claim 10, wherein each of said side panels has two sides connected at approximately right angles to each other, and a third side opposite a corner formed by said two sides, said third side being secured to one of said elongated bars of the net frame.

12. The device of claim 10, wherein longitudinal dimensions of said net frame bars are greater than longitudinal dimensions of said upper frame bars.

13. A rescue device for retrieval of persons or objects from water for use with a helicopter, the device comprising;
    an upper rigid attachment frame means for attaching the device to skids of the helicopter, said attachment frame means comprising a substantially rectangular frame comprised of two parallel attachment bars adapted for attachment in parallel relationship to the helicopter skids and two transverse bars rigidly attached at right angles adjacent opposite ends of the attachment bars;
    a space support means extending downwardly from said upper attachment frame means and fixedly attached to said upper attachment frame means, said space support means comprising a plurality of elongated bars, each extending at an angle from a corner connecting said parallel and said transverse bars of the upper attachment frame;
    a lower rigid net frame means fixedly attached to a lower portion of said support means, said net frame means comprising a substantially rectangular frame comprised of two parallel elongated bards and two cross bars rigidly attached at right angles adjacent opposite ends of the elongated parallel bars;
    an arched reinforcement bar fixedly attached to and extending upwardly between said elongated bars of said net frame below said net frame means below said upper attachment means; and
    a deformable net means having an open front end and an open top carried along its upper peripheral edge by said lower net frame means in secured relationship to said lower net frame means, said net means comprising a rectangular bottom net panel, a rectangular back panel and a pair of parallel triangular side panels.

14. The device of claim 10, wherein each of said net side panels has a shorter side which is connected to one of the sides of said back net panel.

* * * * *